April 16, 1946. A. GRUNSPAN 2,398,424
PROCESS AND APPARATUS FOR OBTAINING A SYNTHETIC IVORY COLORED CERESIN
Filed Jan. 7, 1943 2 Sheets-Sheet 2
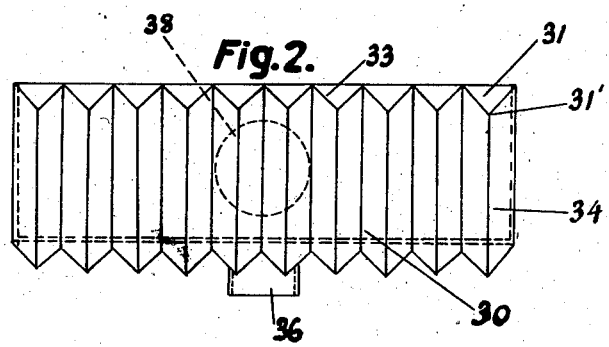
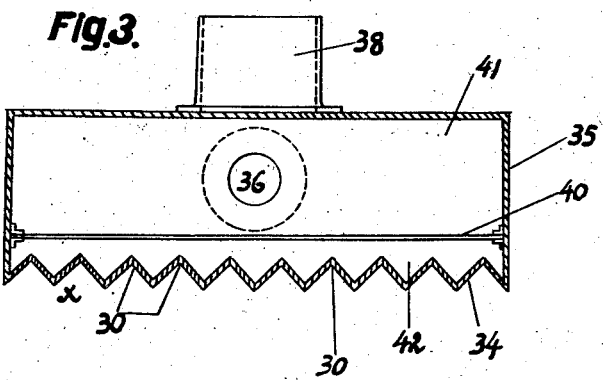
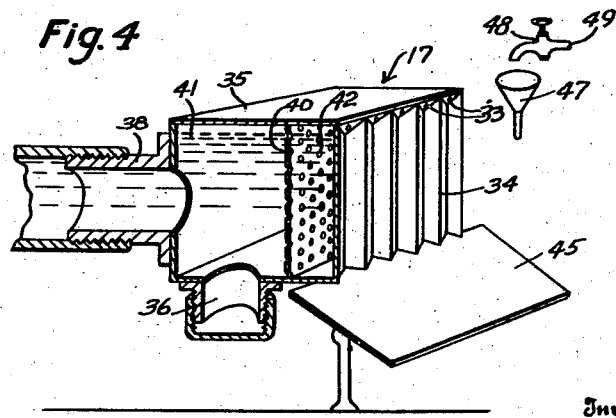

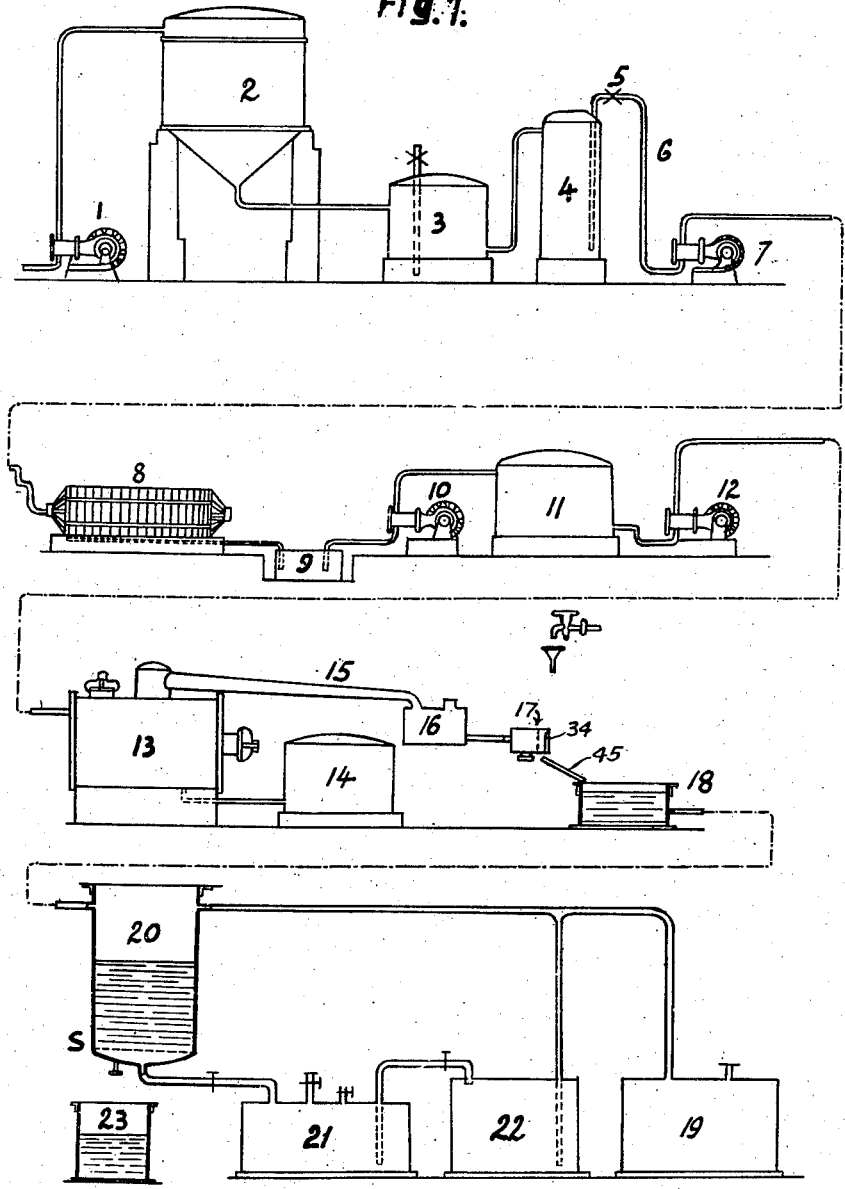

Patented Apr. 16, 1946

2,398,424

UNITED STATES PATENT OFFICE 2,398,424

PROCESS AND APPARATUS FOR OBTAINING A SYNTHETIC IVORY COLORED CERESIN

Adolf Grunspan, Wimbledon S. W. 19, London, England, now by judicial change of name Adolphus F. Garvin Application January 7, 1943, Serial No. 471,610
In Great Britain May 1, 1941

10 Claims. (Cl. 196—18)

By the process which I patented November 17, 1925 (U. S. A. Patent 1,562,425) the crystalline wax is removed from the residuum with a filterpress, the amorphous wax of distillation.

According to my present invention, a synthetic ivory colored ceresin can be obtained from crude oil residuum or other hydrocarbons containing both crystalline paraffin wax and amorphous paraffin wax, by cleaning the oil to be treated, separating the paraffin wax in crystalline form by adding low boiling point petroleum or paraffin distillate, and by spreading the amorphous ceresin wax, distilled over after filtration, under a spray of water, whereby the amorphous paraffin wax is formed into shreds, from which any remaining oil is finally extracted by a suitable medium.

The material produced by my process is identical in composition, constitution and properties to ceresin which of course is an amorphous paraffin wax obtained by purifying ozokerite, and therefore I refer to the said material as synthetic ceresin.

Thus the method of purifying hydrocarbons, as disclosed in my Patent No. 1,562,425, which resulted in the separation of amorphous wax, is extended to further treatment of the thus gained amorphous wax.

It is therefore, the main object of the present invention to provide a method of and an apparatus for forming shreds of high melting point, ivory colored amorphous wax.

The following example will serve to show how my process and apparatus may be carried into practice in obtaining ivory colored ceresin.

The crude oil residuum or other hydrocarbons containing amorphous and crystalline wax is diluted with low boiling point petroleum or paraffin oil distillates and the crystalline wax is allowed to settle. It is then filtered and the filteroil obtained subjected to a careful distillation until the amorphous wax distils over.

The amorphous wax distillate so obtained is a thick liquid and is further treated so that it flows in fine streams under a spray of water, with the result that the amorphous paraffin wax forms into fine thin shreds. The shreds are then passed through an extracting medium and thus freed from oil, and an oil-free synthetic ivory colored ceresin with high melting point over 170° F. is then produced.

The exact working of the invention is explained by the attached drawings. Fig. 1 represents a side elevation of the plant. Figs. 2, 3 and 4 show details of the particular apparatus for precipitating the ceresin in the form of long thin shreds.

Fig. 2 is the appearance from the front, and Fig. 3 from above, while Fig. 4 is a view in perspective. The pump 1 (Fig. 1) presses the hot amorphous wax distillate into an agitator 2 where it is preliminarily cleaned, from which the treated oil runs into a receiving tank 3 where it is cooled down to atmospheric temperature. This receiving tank is then filled with petroleum distillate to 50% of its volume and this mixture is passed by means of a pressure vessel 4 through pipe 6 controlled by valve 5 to a pressure pump 7 which presses the mixture through a filterpress 8 which removes the crystalline wax. The filtrate flows into the container 9, out of which it passes through pump 10 into the main receiving tank 11. From there pump 12 passes the filtrate into the still 13, where a careful distillation by means of steam and vacuum is effected. The oil-residuum obtained in the still 13 then runs finally as waxfree lubricating oil stock into a storage tank 14, and the overhead amorphous wax distillate as a thick liquid distillate, runs through 15 and 16 into the distributor 17 and 18, by which it is distributed in thin streams on to a sloping platform 45, where it spreads fanwise and is continuously washed by cold water, which breaks up the amorphous paraffin wax into the form of long thin shreds. (These shreds can then be made entirely free from oil by any known extracting medium.)

The apparatus for obtaining the synthetic ceresin in the form of shreds from the amorphous wax distillate, according to the present invention is shown in greater detail in Figs. 2–4. It consists of a device 17 to produce the amorphous wax in fine streams, and of a platform 45 for spreading out these streams in the shape of a fan. The distributor 17 shows several channels 30 from which runways 31 are arranged for conducting the amorphous wax. The channels 30 are shown in the diagram as a plate in a wave or zig-zag form 34. The plate 34 forms the end wall of a container 35, which has an outlet pipeline 36 which is used when the container 35 is to be entirely emptied by removing a closing cap and an inlet pipeline 38 which are both controlled by valves. The container 35 is divided into two compartments 41 and 42, by means of a sieve wall, to equalize the pressure of the incoming oily amorphous wax distillate. The line 38 ends in the compartment 41. Compartment 42 is walled by the corrugated wall 34. Parts of the wall 34 are at the top on the side nearest the sieve wall 40, cut away on the inner surfaces, so as to give the upper edge 33 an uneven line, and so that the line of this edge on the inner parts of the corrugations is lower than the line of the edge on the outer part. In the drawings the corrugated end wall 34 is shown with three-cornered top edges 31, whose lower edges 31' are at the back of the channels 30.

The arrangement 45 for the fanwise spreading of the streams of amorphous wax consists of a sloping platform. Above this platform 45 there is a water inlet Z for delivering the water in a fine spray. The inlet consists of a funnel 47 in the diagram and a valve 48, with which the amount of water flowing from pipe 49 to funnel 47 can be regulated.

The hot oily amorphous wax distillate, flowing in by the pipe line 38 into the container 35, first fills the compartments 41 and 42 and when it has reached a level higher than the points 31' flows in fine streams down along the channels 30 towards the sloping distributing platform 45 and spreads fanwise on it. The water flowing onto and through this oily amorphous wax fan by way of funnel 47 forms it into thin shreds or film-like tapes. The oil in these wax shreds can then be extracted. The shreds mixed with the water obtained by this process are passed to the extracting plant 20 (Fig. 1) and are there treated with the extracting medium, which with the extracted oil is drained off into container 21. By the continual drainage of surplus water into a water container 23, the oil-free synthetic ivory colored ceresin shreds remain on the sieve S towards the bottom of the extracting plant 20. The extracted oil can either be pressed back from this container 21 through tank 22 into the extraction plant 20 to extract any remaining amorphous paraffin wax, or it can be pressed into container 19 to be freed from the extracting medium.

I claim:

1. Apparatus for the treatment of liquid hydrocarbons comprising paraffin-base crude oil residuum to produce a synthetic ceresin by separating high melting point amorphous wax contained in the residuum into shreds, comprising in sequence, an agitator for preliminary cleaning of the oil, a mixing tank for addition to the oil of a low boiling point petroleum distillate, a filter-press for separating off insoluble crystalline wax precipitated by the action of the petroleum distillate, a still for distilling over the amorphous paraffin wax from the filtrate, a device for forming the amorphous wax distillate into shreds comprising means for causing the distillate to flow in a plurality of fine streams onto an inclined platform, means for spraying water onto said platform, and an extracting vessel for freeing the remaining oil from the shreds.

2. Apparatus for the treatment of liquid hydrocarbons comprising paraffin-base crude oil residuum to produce a synthetic ceresin by separating high melting point amorphous wax contained in the residuum into shreds, comprising in sequence, an agitator for preliminary cleaning of the oil, a mixing tank for addition to the oil of a low boiling point petroleum distillate, a filter-press for separating off insoluble crystalline wax precipitated by the action of the petroleum distillate, a still for distilling over the amorphous paraffin wax from the filtrate, a flat sloping platform, means to spray water onto said platform and means for distributing the amorphous wax-distillate into a series of fine streams fanwise onto said platform beneath the spray of water.

3. Apparatus for the treatment of liquid hydrocarbons comprising paraffin-base crude oil residuum to produce a synthetic ceresin by separating high melting point amorphous wax contained in the residuum into shreds, comprising in sequence an agitator for preliminary cleaning of the oil, a mixing tank for addition to the oil of a low boiling point petroleum distillate, a filter-press for separating off insoluble crystalline wax precipitated by the action of the petroleum distillate, a still for distilling over the amorphous paraffin wax from the filtrate, a container to receive the amorphous wax distillate, a deeply corrugated sheet metal front wall to said container, an inlet pipe to supply the amorphous wax distillate to said container, a sieve between said inlet pipe and said corrugated wall, a flat sloping platform adapted to feed the distillate in fine streams from said corrugated wall, and means to spray water on to said platform.

4. Apparatus for forming oil-free, ivory colored shreds of high melting point amorphous wax, comprising a container for the said liquid amorphous wax, and a flat sloping platform, means to spray water onto said platform and means for distributing the liquid amorphous wax into a series of fine streams fanwise onto said platform beneath the spray of water.

5. Apparatus for forming oil-free, ivory colored shreds of high melting point amorphous wax, comprising a container to receive the said liquid amorphous wax, a corrugated wall on one side of the said container, an inlet pipe to supply the said wax to the said container, a sieve wall in said container between said inlet pipe and said corrugated wall, a flat sloping platform adapted to feed the wax in fine streams from said corrugated wall, and means to spray water onto said platform.

6. The method of forming oil-free, ivory colored shreds of high melting point amorphous wax, comprising the steps of causing liquid amorphous wax to flow in fine streams under a spray of water to produce solidified thin shreds of the amorphous wax, and then subjecting the said shreds to the action of a solvent for the oil to extract the oil contained in the shreds from the latter.

7. The method of forming oil-free, ivory colored shreds of high melting point amorphous wax, comprising the steps of conducting liquid amorphous wax as a series of fine streams under a spray of water to produce solidified thin shreds of the amorphous wax and freeing said shreds of oil contained in the latter by extracting the oil from the said shreds.

8. The method of producing ivory colored high melting point substantially pure amorphous wax substantially identical in composition, constitution and properties to ceresin, from liquid hydrocarbons comprising paraffin base crude oil residuum, comprising the steps of separating the crude wax oil mixture into its constituents, crystalline paraffin wax, lubricating oil and amorphous wax, by the addition of a low boiling point petroleum distillate and by filtration to remove the crystalline paraffin wax, distilling the amorphous wax from the oil and wax mixture and then causing the amorphous paraffin wax distillate to flow in fine streams under a spray of water to produce solidified thin shreds of the amorphous wax, and subjecting the said shreds to the action of a solvent for the oil to extract the remaining oil from the amorphous wax.

9. The method of producing a synthetic oil-free ivory colored ceresin from liquid hydrocarbons comprising amorphous paraffin wax together with crystalline paraffin, comprising the steps of cleaning the oil to be treated, adding to the cleaned oil a low boiling point petroleum distillate and thereby causing separation therefrom as a precipitate of the crystalline paraffin wax, thus precipitating the crystalline paraffin wax and removing the latter by filtering, to produce a filtrate containing lubricating oil and amorphous wax, distilling this mixture to produce an overhead distillate of amorphous wax and an oil bottoms and conducting the amorphous paraffin wax distillate as a series of fine streams under a spray of water to produce solidified thin shreds of the amorphous wax, and finally freeing said shreds of any remaining oil by an extracting medium for the oil.

10. Apparatus for forming oil-free ivory colored shreds of high melting point amorphous wax comprising means for causing a distillate containing amorphous wax to flow in a plurality of fine streams onto an inclined platform, thereby forming the amorphous wax into shreds, means for spraying water onto said platform, and extracting means for freeing oil contained in the said shreds from the latter.

ADOLF GRUNSPAN.